(12) United States Patent
Karampuri et al.

(10) Patent No.: US 9,317,508 B2
(45) Date of Patent: *Apr. 19, 2016

(54) PRO-ACTIVE SELF-HEALING IN A DISTRIBUTED FILE SYSTEM

(75) Inventors: Pranith Kumar Karampuri, Jeedimetla (IN); Anand Vishweswaran Avati, Kamataka (IN); Vijay Bellur, Kamataka (IN)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/607,557

(22) Filed: Sep. 7, 2012

(65) Prior Publication Data
US 2014/0074798 A1   Mar. 13, 2014

(51) Int. Cl.
*G06F 17/30* (2006.01)

(52) U.S. Cl.
CPC ...... *G06F 17/3007* (2013.01); *G06F 17/30215* (2013.01)

(58) Field of Classification Search
CPC .................................................. G06F 17/3007
See application file for complete search history.

(56) References Cited

U.S. PATENT DOCUMENTS

| | | | |
|---|---|---|---|
| 7,418,439 B2 | 8/2008 | Wong | |
| 7,818,408 B1 * | 10/2010 | Ignatuk et al. | 709/221 |
| 8,296,398 B2 * | 10/2012 | Lacapra et al. | 709/219 |
| 8,627,446 B1 | 1/2014 | Eaton et al. | |
| 2002/0133491 A1 * | 9/2002 | Sim et al. | 707/10 |
| 2003/0208511 A1 * | 11/2003 | Earl et al. | 707/204 |
| 2008/0010507 A1 | 1/2008 | Vingralek | |
| 2010/0185894 A1 * | 7/2010 | Herta | 714/4 |
| 2010/0293137 A1 * | 11/2010 | Zuckerman et al. | 707/610 |
| 2014/0074799 A1 | 3/2014 | Karampuri et al. | |

OTHER PUBLICATIONS

USPTO Office Action for U.S. Appl. No. 13/607,557 mailed Feb. 28, 2013.
USPTO Office Action for U.S. Appl. No. 13/685,604 mailed Jun. 18, 2013.
USPTO Office Action for U.S. Appl. No. 13/685,604 mailed Mar. 13, 2014.
USPTO Office Action for U.S. Appl. No. 13/685,604 mailed Sep. 12, 2014.

* cited by examiner

*Primary Examiner* — Bai D. Vu
(74) *Attorney, Agent, or Firm* — Lowenstein Sandler LLP

(57) ABSTRACT

A first storage server identifies a second storage server connecting to a cluster of storage servers in a file system. The first storage server locates a file in a replication directory hierarchy in the second storage server. The file has not been accessed by a client application. The first storage server determines, prior to the file being accessed by the client application, that the file on the second storage server has stale data and overwrites the stale data in the file on the second storage server with current data.

20 Claims, 4 Drawing Sheets

PRO-ACTIVE SELF-HEALING IN A DISTRIBUTED FILE SYSTEM

TECHNICAL FIELD

The present disclosure relates to a distributed file system, and more particularly, to pro-actively self-healing of a file in a distributed file system.

BACKGROUND

Data may be stored as unstructured data, for example, in files and directories in a file system. A distributed file system may store multiple copies of a file and/or directory on more than one storage server machine to help ensure that, in case of a hardware failure and/or system failure, the data should still be accessible. If a storage server machine experiences a failure, the storage server machine may be unavailable, but changes can still be made to the data on the copies of the data on the available storage server machines. The data on the storage server machine that is down may be stale, which is data that no longer is a current version of the data. When the failed storage server machine is powered back up, the changes which were made to the other copies of the data should be propagated to the failed storage server machine. The process of updating the stale data on the storage server machine may be known as "self-healing." In traditional self-healing solutions, self-healing is driven by a client device and a mount point to the file system. Such conventional self-healing solutions use a significant amount of client resources, which may impact the performance of the client device. Such conventional self-healing solutions do not start until a client application accesses a file, thus causing the client application to wait until the file is self-healed before the client application can access the file.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
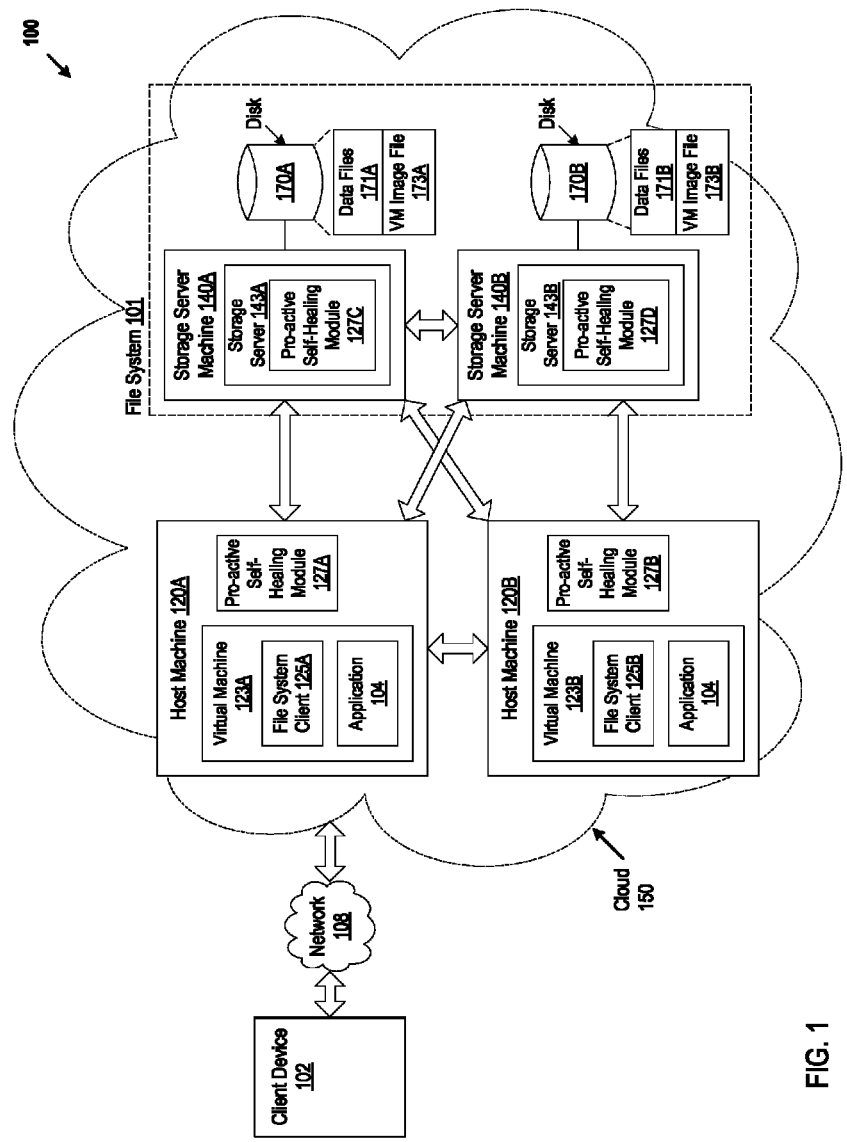
FIG. 1 illustrates an example system architecture, in accordance with various implementations.

Described herein are a method and apparatus for pro-actively self-healing a file prior to the file being accessed by an application. A cluster of storage server machines may store a copy of data in a replication domain to help prevent data loss. A cluster is a set of linked storage servers working together closely. For example, each of a cluster of storage server machines A-D may store a copy of a file-XYZ. Storage server machine-A may experience a system failure and may be unavailable for a period of time. While storage server machine-A is down, changes may be made to the copies of file-XYZ that reside on storage server machine-B, storage server machine-C, and storage server machine-D. File-XYZ on storage server machine-A is a stale copy of data and copies of file-XYZ on storage server machine-B, storage server machine-C, and storage server machine-D are fresh copies of the data. A fresh copy of a file contains the most current version of the data of the file. A stale copy of a file does not contain the most current version of the data of the file.

When storage server machine-A is back up and running and re-connecting to the cluster of storage servers, the stale file-XYZ on storage server machine-A should be updated. A storage server that is connecting to a cluster of storage servers is hereinafter referred to as a "recovered storage server." The process of updating the data on the recovered storage server machine to reflect the current version of the data is hereinafter referred to as "self-healing." Self-healing can include overwriting stale data in a file with current data. In traditional self-healing solutions, self-healing is driven by a client device, which may or may not be in a cluster, and a mount point to the file system. Typically, client devices would access the files in the file system by performing a mount operation on the file system. Mounting takes place before a computer (e.g., client device) can use any kind of storage device on the file system. A client device can only access files on mounted media. Once the mount operation is performed, the client device can read the files and folders. Such conventional self-healing solutions use a significant amount of client resources, which may impact the performance of the client device. Traditional self-healing solutions do not start until a client application accesses a file, thus causing the client application to wait until the file is self-healed before the client application can access the file.

Implementations of the present disclosure describe storage server machines that host a pro-active self-healing module, which is described in greater detail below, to initiate the self-healing process on a file without waiting for a client application to first access the file. The pro-active self-healing module can detect that the recovered storage server (e.g., storage server machine-A) is connecting to the cluster of storage servers (e.g., set of storage server machines B-D) and can pro-actively start the self-healing of the files (e.g., file XYZ on storage server machine-A) at the recovered storage server.

FIG. 1 is an example system architecture 100 for various implementations. The system architecture 100 can include a cloud 150 which can provide virtual machines, such as virtual machines 123A-B. There can be any number of virtual machines 123A-B in the cloud 150. Each virtual machine 123A-B can be hosted on a physical host machine 120A-B configured as part of the cloud 150. For example, virtual machines 123A-B may be respectively hosted on host machines 120A-B in cloud 150. Each host machine 120A-B can be a server computer system, a desktop computer or any other computing device. The host machines 120A-B can communicate to each other via a network (not shown), which may be may be a private network (e.g., a local area network (LAN), a wide area network (WAN), intranet, or other similar private networks) or a public network (e.g., the Internet). The host machines 120A-B can be located in a data center. The cloud 150 can be provided by a cloud provider.

Users can interact with applications 104 executing on the virtual machines 123A-B using client computer systems, such as client device 102. An application 104 can be any type of application including, for example, a web application, a desktop application, a database management application, a browser application, etc. Client devices 102 can be connected to host machines 120A-B via a network 108, which may be may be a private network (e.g., a local area network (LAN), a wide area network (WAN), intranet, or other similar private networks) or a public network (e.g., the Internet). The client device 102 can be a mobile device, a PDA (personal digital assistant), a laptop, a desktop computer, or any other computing device.

The virtual machine 123A-B can be instantiated on the host machine 120A-B using a virtual machine image file 173A-B that may be stored in an image repository. Multiple copies of the virtual machine image file 173A-B can be stored in an image repository on the disks 170A-B for redundancy to prevent data loss. For example, virtual machine image file 173B, which may be a copy of virtual machine image file 173A, may be stored on disk 170B and managed by storage server machine 140B. The image repository can represent a single data structure or multiple data structures (databases, repositories, files, etc.) residing on one or more mass storage devices, such as magnetic or optical storage based disks 170A-B, solid-state drives (SSDs) or hard drives.

The virtual machine image file 123A-B can identify the base operating system and the software package(s) (e.g., file system client 125A-B, application 104) to be loaded on a host machine 120A-B for instantiating a virtual machine 123A-B. A file system client 125A-B allows a virtual machine 123A-B to communicate with the file system 101 and perform operations (e.g., read, write) on the data (e.g., data files 171A-) that is stored in the file system 101.

The cloud 150 can include a distributed file system 101 connected to the host machines 120A-B via a network (not shown). The network may be a public network, a private network, or a combination thereof. A distributed file system 101 can be a network attached storage file system that includes one or more storage server machines 140A-B and any number of disks 170A-B coupled to the storage server machines 140A-B. A storage server machine 140A-B can include a network-accessible server-based functionality (e.g., storage server 143A-B) or other data processing equipment. The storage server machines 140A-B can include, and are not limited to, any data processing device, such as a desktop computer, a laptop computer, a mainframe computer, a personal digital assistant, a server computer, a handheld device or any other device configured to process data.

The storage server machines 140A-B can be clustered in a replication domain to store multiple copies of data (e.g., data files 171A-B, virtual machine image files 173A-B) on various disks 170A-B to prevent data loss in case one of the storage servers machine 140A-B is unavailable, for example, due to a system failure or a hardware failure. A data file 171A-B can store data that can be accessed by a client application (e.g., application 104). Each storage server 143A-B can manage the data (e.g., files 171A-B, files 173A-B) being replicated in the cluster using a replication directory hierarchy, which is a directory structure that contains the files being replicated amongst the clustered storage servers 143A-B. The storage servers 143A-B can propagate any changes that are made to the files in their corresponding replication directory hierarchy to the other copies of the data that are stored on the other disks and/or managed by other storage servers 143A-B. For example, disk 170B may store a file 171B. A copy of file 171B may be stored on disk 170A. When a change is made to file 171B, the storage server machine 140B, which may manage file 171B, can contact storage server 140A, which may manage file 171A, to make the same change in file 171A.

When a storage server machine 140A-B is unavailable, for example, the storage server machine 140A may have experienced a system failure, changes can be made to the copies of the data (e.g., data files 171A-B, virtual machine image files 173A-B) using another storage server machine, such as storage server machine 140B, that is available. When storage server machine 140A becomes available, for example, storage server machine 140A is re-booted and/or reconnecting to the cluster, the files in the replication directory hierarchy in the storage server machine 140A may be stale. The files may be stale in that the files in the replication directory hierarchy in the recovered storage server machine (e.g., storage server machine 140A) may not match the copies of the file in the other storage server machines, such as storage server machine 140B, that were available. A stale copy of the file does not contain the most current version of the data of the file. A fresh copy of the file contains the most current version of the data of the file.

The machines (e.g., storage server machines 140A-B, host machines 120A-B) can include a pro-active self-healing module 127A-D to pro-actively self-heal files (e.g., virtual machine image file, data file) in a replication directory hierarchy in a recovered storage server. The machines (e.g., storage server machines 140A-B, host machines 120A-B) may be in a distributed system which allows any of the pro-active self-healing modules 127A-D to initiate the self-healing of the files at the recovered storage server. For example, the self-healing of the file may be initiated and performed by a storage server that detects a recovered storage server is rejoining the cluster. The pro-active self-healing module 127A-D does not wait until a file at the recovered storage server is accessed by a client application (e.g. application 104) in order to start the self-healing process. In one implementation, the pro-active self-healing module 127A-D is a daemon, which is a process that is running in the background. In some operating systems, a daemon is a computer program that runs as a background process, rather than being under direct control of an interactive user. The pro-active self-healing module 127A-D can detect that the recovered storage server is rebooted and/or re-connected to the cluster and can automatically initiate the self-healing process on each file in the replication directory hierarchy at the recovered storage server. The pro-active self-healing module 127A-D can read data from a fresh copy of the file on another storage server machine, and write the fresh data over the file in the replication directory hierarchy that is being self-healed. In one implementation, the pro-active self-healing module 127A-D automatically self-heals all of the files in the replication directory hierarchy that contain stale data. The pro-active self-healing module 127A-D can crawl the replication directory hierarchy, evaluates each file, and self-heals the files that have stale data.

Figure 2:
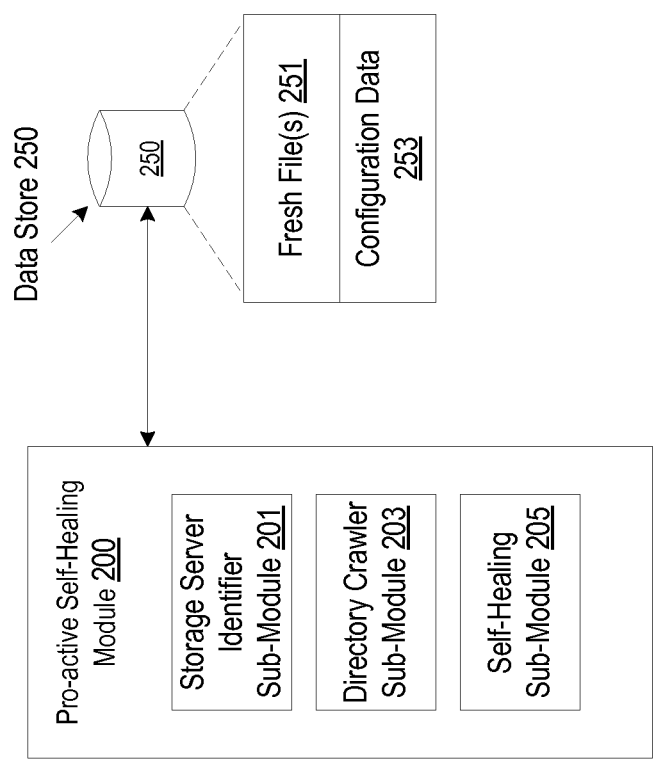
FIG. 2 is a block diagram of an implementation of a pro-active self-healing module.

FIG. 2 illustrates a block diagram of one implementation of a pro-active self-healing module 200. The pro-active self-healing module 200 may correspond to a pro-active self-healing module 127A-D in a machine 120A-B,140A-B of FIG. 1. The pro-active self-healing module 200 can include a storage server identifier sub-module 201, a directory crawler sub-module 203, and a self-healing sub-module 205. Note that in alternative implementations, the functionality of one or more of the sub-modules can be combined or divided.

The storage server identifier sub-module 201 can identify a recovered storage server. The storage server identifier sub-module 201 can monitor network connections to the storage servers in the cluster. The storage server identifier sub-module 201 can detect when a recovered storage server is establishing a network connection to the cluster. The storage server identifier sub-module 201 can be configured to listen for network events (e.g., link detected). In one implementation, the storage server identifier sub-module 201 periodically requests a link status for various networks ports.

The directory crawler sub-module 203 can locate the replication directory hierarchy in a directory structure of the identified recovered storage server. The replication directory hierarchy can include a top-level directory, one or more sub-directories, one or more levels for the sub-directories, and files. The directory crawler sub-module 203 can be configured to locate a specific volume name or part of a volume name to identify the replication directory hierarchy in the recovered storage server. The volume name and/or part of the volume can be specified in configuration data 253 that is stored in the data store 250 that is coupled to the directory crawler sub-module 203. The directory crawler sub-module 203 can identify each file in the located replication directory hierarchy.

The self-healing sub-module 205 can self-heal a file at the recovered storage server. In one implementation, the self-healing sub-module 205 automatically self-heals each file in the replication directory hierarchy at the recovered storage server that contains stale data. The self-healing sub-module 205 can evaluate each file in the replication directory hierarchy at the recovered storage server and self-heal the files that contain stale data. For example, the self-healing sub-module 205 can compare the content of a file in the replication directory hierarchy at the recovered storage server to a fresh copy 251 of the corresponding file residing in the local data store 250. For example, the self-healing sub-module 205 can compute a hash for each of the content of the files (e.g., fresh copy of the file and file being self-healed) and compare the hash values to each other. In another example, the self-healing sub-module 205 can compute a checksum for each of the content of the files and compare the checksum values to each other. The self-healing sub-module 205 can compare the files to each other using change logs.

The change log for a file (e.g., fresh copy of the file and file being self-healed) can be stored in an extended attribute of the file. The files can have an extended attribute that stores change log data. The change log can include information identifying operations that have succeeded on each version of the file. Change logs can be stored in a distributed manner with each copy of the file, where each storage server machine that stores a copy of a file can maintain a change log in an extended attribute of the corresponding file. Each copy of the file, for example on different storage servers, can store a part of the change log in an extended attribute of the file. For example, storage server machine-A maintains a change log for file-XYZ in an extended attribute in the local copy of file-XYZ and storage server machine-B maintains a change log for file-XYZ in an extended attribute in the local copy of file-XYZ.

In one implementation, the self-healing sub-module 205 uses full-file lock self-healing to self-heal a file. In full-file lock self-healing, the self-healing sub-module 205 can acquire a lock on the entire file and the self-healing sub-module 205 may not permit write access to any application while the entire file is locked. When the self-healing process is complete, the self-healing sub-module 205 can release the full-file lock and the file can be accessed for read and write operations.

In another implementation, the self-healing sub-module 205 uses granular self-healing to self-heal a file. In granular self-healing, the self-healing sub-module 205 can acquire a full-file lock on the file to inspect and extract data from one or more change logs corresponding to the file to identify which storage server machines contain a fresh copy of the file. The self-healing sub-module 205 can acquire a lock on a region (e.g., 128 kilobytes, 64 kilobytes) of the file and release the full-file lock. The self-healing sub-module 205 can use a checksum to determine whether the locked region should be self-healed. The file may have some regions that contain data that is up to date and should not be self-healed. If a region should be self-healed, the self-healing sub-module 205 can change the stale data in the locked region to the current data by reading data for a corresponding region in a fresh copy from a storage server machine (e.g., storage server machine-B) that contains a fresh copy of the file and writing the current data over the stale data in the locked region in the stale file. The self-healing sub-module 205 can iteratively acquire a lock on a next region of the file at the recovered storage server and release the lock on the preceding region to maintain control of the file. The self-healing sub-module 205 can grant write access to the unlocked regions of the file while a locked region is being self-healed.

For example, while the file is being self-healed, the self-healing sub-module 205 may receive a write request to access the file from an application. If the write request is for the region that is currently locked, the self-healing sub-module 205 can instruct the application to wait. If the write request is for another region of the stale file that is unlocked, the self-healing sub-module 205 can provide write access to the requested region during the self-healing of the locked region of the file. When the self-healing sub-module 205 receives a read request, the self-healing sub-module 205 can redirect the request to a storage server machine (e.g., storage server machine-B) that contains a fresh copy of the file. When the last region of the file is self-healed, the self-healing sub-module 205 can acquire a full-file lock on the file, release the lock on the last region, update the change log to indicate the file is self-healed, and release the full-file lock. The self-healing sub-module 205 can self-heal each file in the storage server machine.

The data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 3:
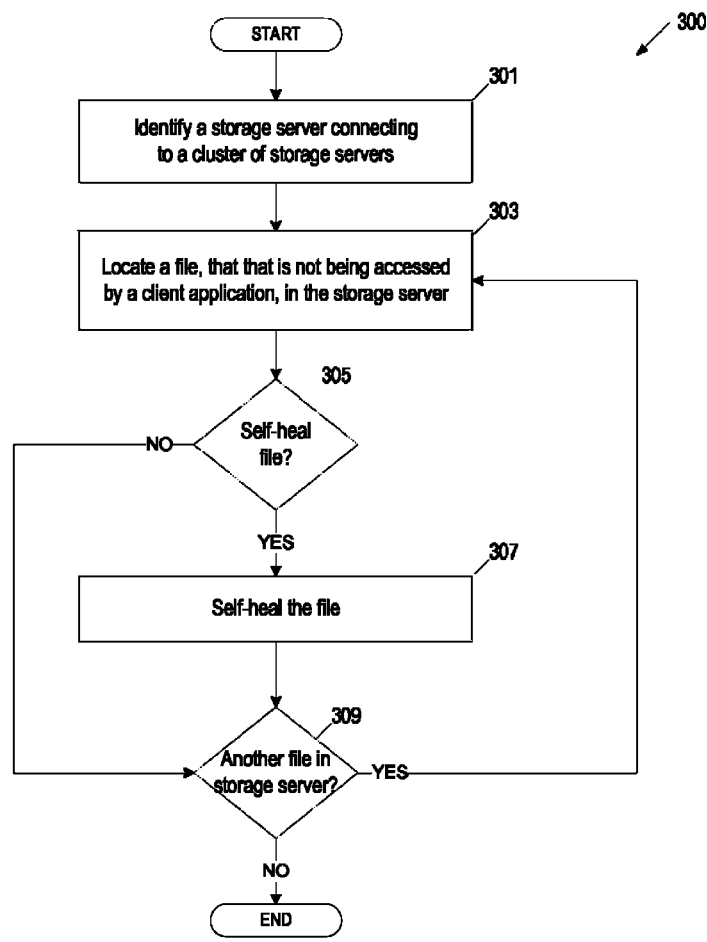
FIG. 3 is a flow diagram illustrating an implementation for a method for pro-actively self-healing a file prior to the file being accessed by an application.

FIG. 3 is a flow diagram of an implementation of a method 300 of pro-actively self-healing a file prior to the file being accessed by an application. Method 300 can be performed by processing logic that can comprise hardware (e.g., circuitry, dedicated logic, programmable logic, microcode, etc.), software (e.g., instructions run on a processing device), or a combination thereof. In one implementation, method 300 is performed by a pro-active self-healing module 127A-D in a machine 120A-B,140A-B of FIG. 1.

At block 301, processing logic identifies a recovered storage server, which is a storage server that becomes unavailable in a cluster of storage servers and is re-connecting to the cluster. Processing logic may determine that the network connection of a storage server is lost and may receive a message from the recovered storage server, for example, when the recovered storage server is powered back on and/or rejoins the cluster of storage servers.

At block 303, processing logic locates a file in the recovered storage server and determines whether the file contains stale data and should be self-healed at block 305. Processing logic can locate the replication directory hierarchy in a directory structure of the identified recovered storage server, for example, by searching for a particular volume name as specified by configuration data. The file can be a file in the replication directory hierarchy that has not yet been accessed, for example, by a client application. In one example, the file is copy of a virtual machine image file that is stored in a data store and has not been accessed. In another example, the file is a copy of a data file for a particular application and has not yet been accessed. For example, the file may be word processing file for a word processing application. Method 300 and/or portions of method 300 may be iterative. The number of iterations can be based on the number of files in a replication directory hierarchy in the recovered storage server. At block 303, processing logic can crawl through the entire replication directory hierarchy at the recovered storage server and determine whether each file in the replication directory structure contains stale data.

For example, processing logic may determine that the data in a file at the recovered storage server does not match the data in a fresh copy of the file at another storage server. In another example, processing logic may determine that the data in a file at the recovered storage server matches the data in a fresh copy of the file at another storage server. If the file does not contain stale data and should not be self-healed (block 305), processing logic determines whether there is another file in the replication directory hierarchy in the recovered storage server at block 309. If there is another file, processing logic returns to block 303 to locate another file in the replication directory hierarchy that has not yet been accessed by a client application. If the file contains stale data (block 305), processing logic self-heals the file at block 307. Processing logic can self-heal the file using granular self-healing or full-file lock self-healing.

Figure 4:
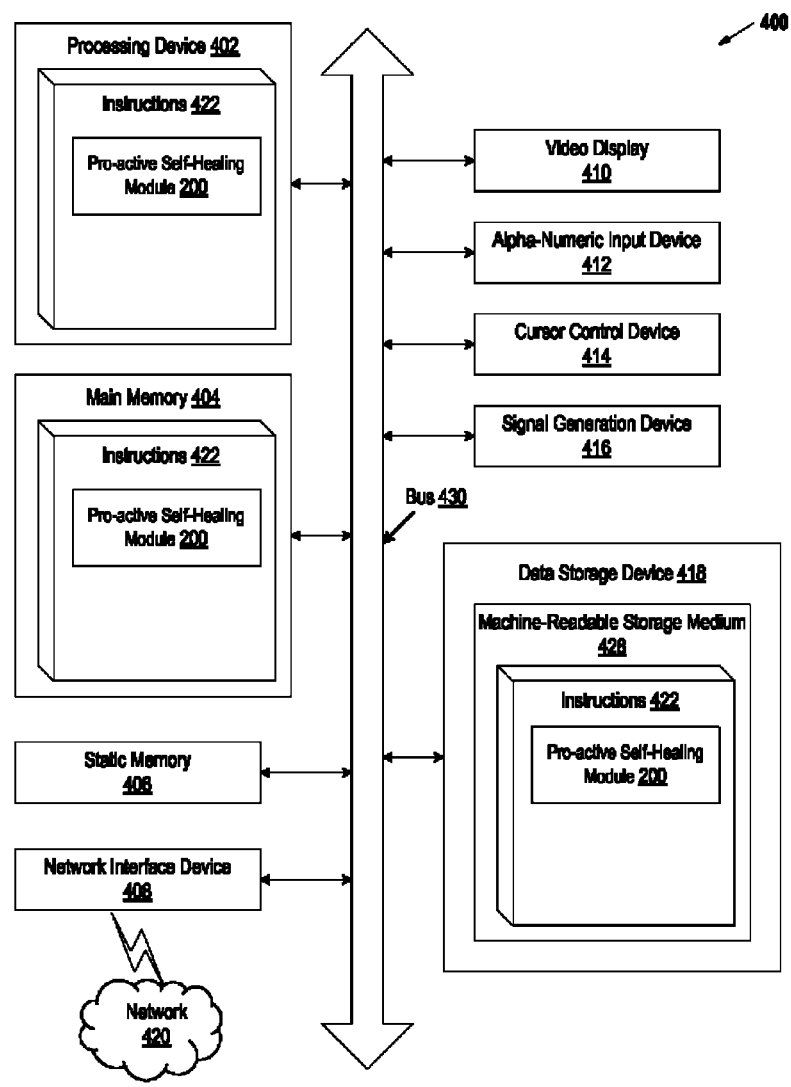
FIG. 4 is a block diagram of an example computer system that may perform one or more of the operations described herein.

FIG. 4 illustrates an example machine of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 402 is configured to execute instructions 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-readable storage medium 428 (also known as a computer-readable medium) on which is stored one or more sets of instructions or software 422 embodying any one or more of the methodologies or functions described herein. The instructions 422 may also reside, completely or at least partially, within the main memory 404 and/or within the processing device 402 during execution thereof by the computer system 400, the main memory 404 and the processing device 402 also constituting machine-readable storage media.

In one implementation, the instructions 422 include instructions for a pro-active self-healing module (e.g., pro-active self-healing module 200 of FIG. 2) and/or a software library containing methods that call modules in a pro-active self-healing module. While the machine-readable storage medium 428 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "locating" or "determining" or "self-healing" or "examining" or "comparing" or "acquiring" or "providing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   requesting, by a processing device on a first server, a link status for a network port related to a second server;
   determining, by the processing device, that the second server after a failure is reconnecting to a cluster of servers in a file system in view of the link status for the network port;
   determining, in response to determining that the second server is reconnecting to the cluster of servers in the file system, that an image file on the second server comprises stale data;
   updating the stale data in the image file on the second server with current data; and
   responsive to detecting a request to access the image file, providing an indication during the updating that the image file is partially locked at a portion comprising the stale data.

2. The method of claim 1, wherein determining that the second server is reconnecting to the cluster of servers in the file system comprises determining that the second server is rebooted.

3. The method of claim 1, wherein determining that the second server is reconnecting to the cluster of servers in the file system comprises determining that the second server is rejoining the cluster of servers in the file system.

4. The method of claim 1, wherein determining that the image file on the second server comprises stale data comprises examining individual files in a replication directory hierarchy on the second server.

5. The method of claim 1, wherein determining that the image file on the second server comprises stale data comprises comparing content of the image file on the second server with content of a corresponding image file on the first server.

6. The method of claim 1, wherein updating the stale data in the image file comprises:
   acquiring a partial lock on the image file comprising the stale data, wherein the partial lock is a lock on a region of the image file;
   overwriting the stale data in the locked region with current data;
   identifying a write request to modify another region of the image file during the overwriting of the locked region of the image file; and
   providing write access to the requested region during the overwriting of the locked region of the image file.

7. The method of claim 1, wherein updating stale data in the image file comprises:
   acquiring a file lock on the image file comprising the stale data; and
   overwriting the stale data in the locked image file with current data.

8. A non-transitory computer-readable medium having instructions encoded thereon that, when executed by a processing device, cause the processing device to:
   request, by the processing device, a link status for a network port related to a server;
   determine that the server after a failure is reconnecting to a cluster of servers in a file system in view of the link status for the network port;
   determine, in response to determining that the second server is reconnecting to the cluster of servers in the file system, that an image file on the server comprises stale data;
   update the stale data in the image file on the server with current data; and
   responsive to detecting a request to access the image file, provide an indication during the updating that the image file is partially locked at a portion comprising the stale data.

9. The non-transitory computer-readable medium of claim 8, wherein the processing device is to determine that the server is reconnecting to the cluster of servers in the file system by determining that the server is rebooted.

10. The non-transitory computer-readable medium of claim 8, wherein to determine that the server is reconnecting to the cluster of servers in the file system the processing device is to determine that the server is rejoining the cluster of servers in the file system.

11. The non-transitory computer-readable medium of claim 8, wherein to determine that the image file on the server comprises stale data the processing device is to examine individual files in the replication directory hierarchy on the server.

12. The non-transitory computer-readable medium of claim 8, wherein to determine that the image file on the server comprises stale data the processing device is to compare content of the image file on the server with content of a corresponding file on another server.

13. The non-transitory computer-readable medium of claim 8, wherein to update the stale data in the image file the processing device is to:
  acquire a partial lock on the image file comprising the stale data, wherein the partial lock is a lock on a region of the image file;
  overwrite the stale data in the locked region with current data;
  identify a write request to modify another region of the image file during the overwriting of the locked region of the image file; and
  provide write access to the requested region during the overwriting of the locked region of the image file.

14. The non-transitory computer-readable medium of claim 8, wherein to update the stale data in the image file the processing device is to:
  acquire a file lock on the image file comprising the stale data; and
  overwrite the stale data in the locked file with current data.

15. A system comprising:
  a memory; and
  a processing device operatively coupled to the memory, the processing device to:
    requesting a link status for a network port related to a server;
    determine that the server after a failure is reconnecting to a cluster of servers in a file system in view of the link status for the network port;
    determine, in response to determining that the server is reconnecting to the cluster of servers in the file system, that an image file on the server comprises stale data; and
    update the stale data in the image file on the server with current data; and
    responsive to detecting a request to access the image file, provide an indication during the updating that the image file is partially locked at a portion comprising the stale data.

16. The system of claim 15, wherein to determine that the server is reconnecting to the cluster of servers in the file system the processing device is to determine at least one of that the server is rejoining the cluster of server in the file system or is rebooted.

17. The system of claim 15, wherein to determine that the image file on the server comprises stale data the processing device is to examine individual files in the replication directory hierarchy on the server.

18. The system of claim 15, wherein to determine that the image file on the server comprises stale data the processing device is to compare content of the image file on the server with content of a corresponding file on another server.

19. The system of claim 15, wherein to update the stale data in the image file the processing device is to:
  acquire a partial lock on the image file comprising the stale data, wherein the partial lock is a lock on a region of the image file;
  overwrite the stale data in the locked region with current data;
  identify a write request to modify another region of the image file during the overwriting of the locked region of the image file; and
  provide write access to the requested region during the overwriting of the locked region of the image file.

20. The system of claim 15, wherein to update the stale data in the image file the processing device is to:
  acquire a file lock on the image file comprising the stale data; and
    overwrite the stale data in the locked image file using current data.

\* \* \* \* \*